United States Patent
Wang et al.

(10) Patent No.: US 6,671,442 B2
(45) Date of Patent: Dec. 30, 2003

(54) OPTICAL FIBER COMMUNICATIONS SYSTEM USING INDEX-GUIDING MICROSTRUCTURED OPTICAL FIBERS

(76) Inventors: Shih-Yuan Wang, 766 Encina Grande, Palo Alto, CA (US) 94306; Aly F. Elrefaie, 21824 Benetti Ct., Cupertino, CA (US) 95014

( * ) Notice: Subject to any disclaimer, the term of this patent is extended or adjusted under 35 U.S.C. 154(b) by 17 days.

(21) Appl. No.: 09/781,344

(22) Filed: Feb. 12, 2001

(65) Prior Publication Data

US 2002/0037136 A1 Mar. 28, 2002

Related U.S. Application Data

(63) Continuation-in-part of application No. 09/591,474, filed on Jun. 9, 2000, now Pat. No. 6,418,258.

(51) Int. Cl.$^7$ .................................................. G02B 6/02
(52) U.S. Cl. ........................ 385/125; 385/123; 385/124; 398/152; 398/164
(58) Field of Search .............................. 385/122–128, 385/24; 359/161, 173

(56) References Cited

U.S. PATENT DOCUMENTS

| | | | |
|---|---|---|---|
| 5,155,792 A | 10/1992 | Vali et al. | 385/125 |
| 5,361,319 A | 11/1994 | Antos et al. | 385/123 |
| 5,400,165 A * | 3/1995 | Gnauck et al. | 385/122 X |
| 5,684,909 A | 11/1997 | Liu | 385/127 |
| 5,748,824 A | 5/1998 | Smith | 385/124 |
| 5,802,236 A | 9/1998 | DiGiovanni et al. | 385/127 |
| 5,809,196 A | 9/1998 | Meli et al. | 385/123 |
| 5,878,182 A | 3/1999 | Peckham | 385/123 |
| 5,907,652 A | 5/1999 | DiGiovanni et al. | 385/125 |
| 5,910,852 A | 6/1999 | Fontana et al. | 359/156 |
| 5,999,679 A | 12/1999 | Antos et al. | 385/127 |
| 6,026,209 A | 2/2000 | Rhee et al. | 385/129 |
| 6,134,367 A | 10/2000 | Jones et al. | 385/124 |
| 6,252,692 B1 * | 6/2001 | Roberts | 359/173 |
| 6,393,178 B2 * | 5/2002 | Ranka et al. | 385/28 |
| 2002/0005969 A1 * | 1/2002 | Ranka et al. | 359/161 |

FOREIGN PATENT DOCUMENTS

WO    WO9964903    12/1999

OTHER PUBLICATIONS

Jopson, B., "Chromatic Dispersion Compensation and Measurement," Optical Fiber Communication Conference 2000 Proceeding, Baltimore, Maryland, TuC, (2000), pp. 1–28.

Russell, Knight, Birks, Mangan, and Wadsworth, Recent Progress in Photonic Crystal Fibres, ThG1–1—ThG–3, 980100, Optical Fiber Communication Conference, 2000, Technical Digest Series, Conference Edition, Baltimore, Maryland, Mar. 7–10, 2000 (Optical Society of America).

(List continued on next page.)

*Primary Examiner*—Phan T. H. Palmer
(74) *Attorney, Agent, or Firm*—Cooper & Dunham LLP

(57) ABSTRACT

A long-distance, high bit-rate optical communications link is described comprising an optical transmitter, an optical receiver, and an index-guiding microstructured optical fiber between the optical transmitter and the optical receiver, the microstructured optical fiber having a majority of the cross-section of the core and cladding regions occupied by voids. The voids are dimensioned such that an effective index of refraction of the cladding region is less than an effective index of the core region, the optical fiber propagating light by an index-guiding effect. The attenuation and dispersion characteristics of the microstructured optical fiber, when expressed in dB/km and ps/(nm-km), respectively, each decrease in approximate proportion to the percentage of cross-sectional area occupied by the voids. An appropriate void-to-cross-sectional area ratio may be selected so as to provide an optical communications link that provides substantially increased data throughput using today's installed base of conduit and communications relay stations.

68 Claims, 10 Drawing Sheets

OTHER PUBLICATIONS

Monro, Bennett, Broderick, and Richardson, "New Possibilities with Holey Fibers," ThG4-1—ThG4-3, 106–108 Optical Fiber Communication Conference, 2000, Technical Digest Series, Conference Edition, Baltimore, Maryland, Mar. 7–10, 2000 (Optical Society of America).

Windeler and Ranka, "Novel Properties of Air–Silica Microstructure Optical Fibers," ThG3-1—ThG3-2, 104–105 Optical fiber Communication Conference, 2000, Technical Digest Series, Conference Edition, Baltimore, Maryland, Mar. 7–10, 2000 (Optical Society of America).

Broeng, Barkou, and Bjarkley, "Polarization Properties of Photonic Bandgap Fibers," ThG2-1—ThG2-3, 101–103 Optical Fiber Communication Conference, 2000, Technical Digest Series, Conference Edition, Baltimore, Maryland, Mar. 7–10, 2000 (Optical Society of America).

Dutton, *Understandin Optical Communications* (Prentice–Hall 1998), Contents and pp. 42–45.

Hecht, *Understanding Fiber Optics*, 3rd ed. (Prentice–Hall 1999), Contents and pp. 68–73.

Keiser, *Optical Fiber Communications*, 3rd ed. (McGraw–Hill 2000), Contents and pp. 70–75.

http://www.blazephotonics.com/pages/techn.htm—dated Mar. 30, 2001 (Leading the Next Generation . . . ).

http://www.blazephotonics.com/pages/press.htm—dated Mar. 30, 2001 (Blaze Photonics Secures . . . ).

U.S. application Ser. No. 09/781,352, filed Feb. 2, 2001.
U.S. application Ser. No. 09/781,343, filed Feb. 12, 2001.
U.S. application Ser. No. 09/781,353, filed Feb. 12, 2001.
U.S. application Ser. No. 09/781,341, filed Feb. 12, 2001.

Elrefaie, A., Wagner, R., Atlas, D. and Daut, D., "Chromatic Dispersion Limitations in Coherent Lightwave Transmission Systems," *Journal of Lightwave Technology*, vol. 6, No. 5, pp. 704–709 (May 1988).

\* cited by examiner

OPTICAL FIBER COMMUNICATIONS SYSTEM USING INDEX-GUIDING MICROSTRUCTURED OPTICAL FIBERS

CROSS-REFERENCE TO RELATED APPLICATIONS

This application is a continuation-in-part of U.S. patent application Ser. No. 09/591,474 now U.S. Pat. No. 6,418,258, filed Jun. 9, 2000, which is assigned to the assignee of the present invention. This application is related to the subject matter of copending patent application Ser. No. 09/781,352, Ser. No. 09/781,343, Ser. No. 09/781,353, now U.S. Pat. No. 6,512,871 and Ser. No. 09/781,341, each filed on the filing date of the present application and assigned to the assignee of the present invention. Each of the above patent applications is incorporated by reference herein.

FIELD

This patent specification relates to the field of optical fiber communications. More particularly, it relates to an optical fiber communications system incorporating index-guiding microstructured optical fibers.

BACKGROUND

As the world's need for communication capacity continues to increase, the use of optical signals to transfer large amounts of information has become increasingly favored over other schemes such as those using twisted copper wires, coaxial cables, or microwave links. Optical communication systems use optical signals to carry information at high speeds over an optical path such as an optical fiber. Optical fiber communication systems are generally immune to electromagnetic interference effects, unlike the other schemes listed above. Furthermore, the silica glass fibers used in fiber optic communication systems are lightweight, comparatively low cost, and are able to carry tens, hundreds, and even thousands of gigabits per second across substantial distances.

A conventional optical fiber is essentially an optical waveguide having an inner core and an outer cladding, the cladding having a lower index of refraction than the core. Because of the difference in refractive indices, the optical fiber is capable of confining light that is axially introduced into the core and transmitting that light over a substantial distance. Because they are able to guide light due to total internal reflection principles, conventional optical fibers are sometimes referred to as index-guiding fibers. Conventional optical fibers have a solid cross-section and are made of fused silica, with the core region and the cladding region having different levels of dopants (introduced impurities) to result in the different indices of refraction. The cladding is usually doped to have a refractive index that ranges from 0.1% (single mode fibers) to 2% (multi-mode fibers) less than the refractive index of the core, which itself usually has a nominal refractive index of 1.47.

As known in the art, single-mode fiber is preferred over multi-mode fiber for high-capacity, long-distance optical communications. Single-mode fiber prevents electromagnetic waves from traveling down in the fiber in anything but a single, tightly held mode near its center axis. This is in contrast to multi-mode fiber, in which incident electromagnetic waves may travel down the fiber over several paths of differing distances. Accordingly, single-mode fiber allows for reduced group delay, and thereby allows optical signals to better keep their shape as they travel down the fiber. As described in Dutton, *Understanding Optical Communications* (Prentice Hall 1998), which is incorporated by reference herein, at p. 45, single-mode fibers may be created by (i) making the core region thin enough, (ii) making the refractive index difference between the core and the cladding small enough, or (iii) using a longer wavelength. Conventional single-mode fibers have a core diameter of about 9 μm and a cladding diameter of about 125 μm, and are single-mode down to a cutoff wavelength of about 1100 nm, below which they become multi-mode.

FIG. 1 shows a conventional optical fiber communications link 100 comprising a source transmitter 102, a destination receiver 104, and a plurality of regeneration spans 106 therebetween. Optical fiber communications link 100 represents a long-haul, high-capacity optical communications link that would run, for example, between the cities of San Francisco and New York, or between the cities of Los Angeles and Las Vegas. Each regeneration span 106 comprises a plurality of amplifier spans 108 and a regenerator 110, and has a length $L_{RG}$ representing the distance between regenerators 110. Each amplifier span 108 comprises a fiber span 112 and an amplifier station 114 that houses a dispersion-compensating fiber loop 116 and an optical amplifier 118, with a length $L_A$ representing the length of the fiber span 112. Within each regeneration span 106 the signal from source transmitter 102 remains all-optical, while at each regenerator 110 the optical signal must be regenerated, i.e. converted into digital electrical signals and then reconverted back into a "clean" optical signal for continued transmission down the optical fiber communications link 100. Generally speaking, each regenerator 110 essentially comprises a combination of an optical receiver similar to the destination receiver 104 and an optical transmitter similar to the source transmitter 102, along with appropriate electrical circuitry therebetween.

In practical implementations, the fiber spans 112 are placed in buried conduit along rights-of-way owned or leased by communications companies, and run between consecutive amplifier stations 114 and regenerators 110 as shown in FIG. 1. As known in the art, each regenerator 110 may be coupled to equipment for adding, removing, or routing data to other communications links, usually when the digital data is in electrical form. Likewise, each amplifier station 114 may include equipment for optically adding or dropping channels at different wavelengths for coupling to other optical fiber communications links. Accordingly, the optical fiber communications link 100 of FIG. 1 generally represents one of several paths between an information source (e.g., in San Francisco) and an information destination (e.g., in New York) within a communications network. However, regardless of the overall communications network in which the optical fiber communications link 100 may be contained, it is important to note that a given information signal originating at the source transmitter 102, e.g., an information signal $f_i(t)$ on an optical carrier at wavelength $\lambda_i$, must generally be regenerated several times prior to arrival at destination receiver 104, and also must generally be optically amplified several times between regenerators.

Amplifier stations 114 and regenerator stations 110 represent substantial costs in installing and maintaining optical fiber communications link 100. Each amplifier station 114 requires housing in a manhole or other type of communications relay shelter, and requires a consistently maintained environment that includes a reliable electrical power supply for powering the optical amplifiers 118. Furthermore, each regenerator 110 comprises an extensive amount of high-cost optical, electro-optical, and electronic equipment that requires an even more stable and consistently-maintained environment, such as that provided by a telephone central office or other central telecommunications facility. In addition to the required costs, each amplifier station 114 and regenerator station 110 adds another possible point of failure for the optical communications link 100, either through a electrical/optical component failure or a power failure. Accordingly, in the design of optical fiber communications link 100, it is desirable to require as few amplifier stations 114 and regenerator stations 110 as possible between the source transmitter 102 and the destination receiver 104.

Also shown in FIG. 1 is a cross-section of a conventional optical fiber 120 used in each fiber span 112, the optical fiber 120 comprising a solid core region 122 surrounded by a solid cladding region 124. Conventional optical fibers suffer from several adverse effects that reduce the efficiency of information transfer and the practical distance over which information may be carried by the light. The two primary adverse effects are (a) attenuation, which is a reduction in signal magnitude as it travels down the fiber, and (b) dispersion, which is a loss of signal shape as different component wavelengths travel down the fiber at different speeds. These two adverse effects often overlap in their unfavorable impacts on optical communication system design. In general, however, attenuation effects serve to (i) reduce the range of wavelengths $\lambda$ that may be used to carry information down a fiber, and (ii) reduce the required spacing between optical amplifiers for those wavelengths that are usable. Also, generally speaking, dispersion effects serve to (i) reduce the rate at which a light beam at a given wavelength $\lambda_i$ may be modulated with information, and (ii) reduce the required spacing between regenerators. As described in Dutton, supra at p.398, attenuation and dispersion are the two critical factors in fiber optic communication system design. Other critical factors include the cost of components and the cost of putting them together.

As dictated by the attenuation and dispersion limitations of conventional optical fibers, today there is a large installed base of optical fiber communications links in which the maximum distance between optical amplifiers is about 100 km, and wherein the maximum distance between regenerators is about 500 km. It would be desirable to provide an optical fiber communications link in which the distances between optical amplifiers and the distances between regenerators is substantially increased, for reducing overall system cost and increasing overall system reliability. Alternatively, it would be desirable to provide an optical fiber communications link which, if substituted into the above installed base of amplifier stations and regenerators, would have substantially increased data throughput using these amplifier and regenerator distances. As a further alternative, it would be desirable to provide an optical fiber communications link which, while maintaining current data rates, would have substantially reduced system hardware requirements in terms of regenerator spacing, optical amplifier spacing, and/or dispersion-compensating fiber lengths, thereby substantially decreasing system construction and maintenance costs and improving system reliability.

Also as dictated by the attenuation and dispersion limitations of conventional optical fibers, conventional long-haul optical fiber links operate in a narrow band of wavelengths between 1530–1570 nm due to the fact that conventional Erbium-Doped Fiber Amplifiers (EDFAs) operate in this range, together with the fact that conventional single-mode fibers have a smaller attenuation (about 0.20 dB/km) in this range. Because it is desirable to carry as much information as possible in this 1530–1570 nm wavelength band, as many channels of information as possible are "squeezed" into this wavelength band using dense wavelength-division multiplexing (DWDM) methods.

DWDM systems modulate successive channels of information $f_i(t)$ onto successive optical carriers at wavelengths $\lambda_i$, which are then multiplexed onto a single fiber. In typical practical systems today, the bandwidth of each signal $f_i(t)$ may be about 10 GHz, while a typical separation between wavelengths $\lambda_i$ may be about 1.6 nm. Although decreases in channel separation (e.g., down to 0.8 nm or smaller) can increase the overall capacity of the optical fiber, these decreases require more expensive, higher-quality optical filtering devices to separate the densely-packed channels from each other, as well as more expensive optical sources having precisely located center wavelengths and narrow wavelength spreads. Also, since the modulation process itself induces a wavelength spread for each channel (about 0.16 nm for 10 GHz modulation), the narrowness of the 1530–1570 nm wavelength band places an upper limit on the amount of information that can be carried even if the more expensive optical filtering devices and optical sources are used. Accordingly, it would be desirable to provide a long-haul optical fiber communications system in which the fiber spans operate at wavelengths additional to those at 1530–1570 nm, thereby providing for (i) increased overall information throughput, and/or (ii) wider channel separations that, in turn, permit the use of lower-cost optical filtering devices and optical sources.

FIG. 2 shows an attenuation plot 200 for a conventional silica glass optical fiber versus wavelength, for wavelengths between 800 nm and 1600 nm (see Dutton, supra at p. 40). Attenuation ($\alpha$) is commonly expressed in dB/km and, as shown in FIG. 2, varies greatly with wavelength for conventional optical fibers. As described further in Hecht, Understanding Fiber Optics, Prentice-Hall (1999), which is incorporated by reference herein, at pp. 82–91, attenuation is primarily caused by absorption of the light by the silica glass and impurities therein, as well as by scattering of the light by atoms within the optical fiber. Generally speaking, attenuation limitations in the design of a fiber optic communications link are dictated by a transmitter power $P_t$ (in dBm), a minimum receiver sensitivity $P_r$ (in dBm), the fiber attenuation $\alpha$ (in dB/km), and the fiber span length $L_A$ (in km) through the relationship of Equation (1):

$$P_r \ge P_t - \alpha L_A \qquad \{1\}$$

As known in the art, the receiver sensitivity $P_r$ will vary inversely with modulation rate, with exemplary conventional values being $P_r = -25$ dBm, $-20$ dBm, and $-15$ dBm at 2.5 Gb/s, 10 Gb/s, 40 Gb/s, respectively. Accordingly, using $\alpha = 0.20$ dB/km for the DWDM wavelength range between 1530–1570 km, conventional maximum fiber span lengths $L_A$ between amplifiers would be about 125 km, 100 km, and 75 km at 2.5 Gb/s, 10 Gb/s, and 40 Gb/s, respectively. It would be desirable to provide an optical fiber communications link using an optical fiber having a reduced attenuation $\alpha$ such that distances between optical amplifiers may be increased for a given data rate, and/or such that data rates may be increased for a given spacing between optical amplifiers.

FIG. 3 shows a dispersion characteristic 300 for a conventional single-mode silica glass optical fiber versus wavelength, for wavelengths between 800 nm and 1600 nm. See Jopson, B., "Chromatic Dispersion Compensation and Measurement," *Optical Fiber Communication Conference 2000 Proceedings*, Baltimore, Md., TuC, pp. 1–28, (2000), which is incorporated by reference herein. Dispersion (D) is commonly expressed in ps/(nm-km) and, as shown in FIG. 3, varies with wavelength. As described further in Hecht, supra at 72–76, dispersion in single-mode fibers is primarily chromatic dispersion, i.e., pulse spreading that arises from differences in the speed that light of different wavelengths travels through materials. Chromatic dispersion, in turn, comprises the components of (i) material dispersion caused by variation of a material's refractive index with wavelength, and (ii) waveguide dispersion caused by the different speeds that light travels in the core and cladding of single-mode fibers. Generally speaking, it is most desirable for a section of optical fiber to have a very low dispersion value (positive or negative) across the wavelengths of operation. However, as described in Hecht, supra at 100, the dispersion value should not be zero because a nonlinear effect referred to as four-wave mixing causes serious problems in WDM systems operating at zero-dispersion wavelengths.

Generally speaking, practical dispersion limitations in the design of an optical fiber communications link may estimated using any of a plurality of thumbnail design guidelines available in the literature. One such guideline is given in Elrefaie, A., Wagner, R., Atlas, D. and Daut, D., "Chromatic Dispersion Limitations in Coherent Lightwave Transmission Systems," *Journal of Lightwave Technology*, Vol. 6, No. 5, pp. 704–709 (May 1988), which is incorporated by reference herein. According to this guideline, for an exemplary transmitter power $P_t=0$ dBm and receiver sensitivity $P_r=-20$ dBm, the length $L_{RG}$ between regenerators may be estimated for a given modulation rate B (in Gbps) and dispersion D (in ps/nm-km) according to Eq. (2):

$$B^2 L_{RG} D < (10 \text{ } Gbps)^2 (50 \text{ } km)(20 \text{ } ps/nm\text{-}km) \quad \{2\}$$

Accordingly, using D=20 ps/(nm-km) for the DWDM wavelength range between 1530–1570 km, conventional distances $L_{RG}$ between regenerators would be about 800 km, 50 km, and 3.1 km at 2.5 Gb/s, 10 Gb/s, and 40 Gb/s, respectively.

In practice, as described in Hecht, supra at 72–76 and 96–97, the distance $L_{RG}$ between regenerators may be increased by (i) using dispersion shifted fibers in the fiber spans 112, and/or (ii) using dispersion compensating fiber loops 116 at regular intervals. Dispersion-shifted fibers have a refractive index profile adjusted such that a negative waveguide dispersion characteristic is intensified to compensate for a positive material dispersion characteristic. Because the negative waveguide dispersion characteristic is relatively flat, the net effect is to move the dispersion characteristic 300 of FIG. 3 to the right by fixed amount, with the zero-crossing moved to 1550 nm in zero-dispersion-shifted fiber or, for example, to about 1450 nm in nonzero-dispersion-shifted fiber. A portion of a dispersion characteristic of a zero-dispersion-shifted fiber is shown as plot 302 in FIG. 3, while a portion of a nonzero-dispersion-shifted fiber is shown as plot 304 in FIG. 3.

In contrast, dispersion compensating fibers are specially designed to have a large negative dispersion characteristic (e.g., −200 ps/nm-km) and are placed in series with the fiber spans at regular intervals. Dispersion-compensating fiber loops 116 are shown in FIG. 1 and, although shown in front of each optical amplifier 118, may alternatively be placed after each optical amplifier 118. Thus, for example, for every 10 km of fiber span 112 having a dispersion of +20 ps/km-nm, there would need to be 1 km of dispersion-compensating fiber having a dispersion of −200 ps/km-nm. As with dispersion-shifted fibers, the net effect of the dispersion-compensating fiber loops 116 is to move the dispersion characteristic 300 of FIG. 3 to the right by fixed amount. Disadvantageously, dispersion-compensating fibers introduce substantial attenuation into the fiber link 100, having typical attenuations of 0.5 dB/km.

More importantly, the use of dispersion-shifting or dispersion-compensating fibers does not alleviate substantial limitations on the range of operable wavelengths of the optical fiber link 100, because the dispersion magnitudes are shifted to smaller values only for a limited range of wavelengths. Disadvantageously, according to these methods, material dispersion is not itself reduced, but is merely compensated for by laterally shifting the dispersion characteristic 300 such that it is smaller in certain wavelengths of operation. The usable range of wavelengths over which the dispersion remains sufficiently low is still limited. In current practical implementations, these limitations are not problematic because of overriding attenuation limitations, i.e., the operable wavelength ranges are limited anyway by attenuation factors (e.g., to 1530–1570 nm for DWDM systems). However, in systems where a wider band of operable wavelengths is desired, the dispersion limitations caused by the steep slope of the dispersion characteristics 300 and 302 may become the limiting factors. Therefore, it would be desirable to provide an optical fiber having a low dispersion characteristic that also has a smaller slope when plotted versus wavelength. With such a dispersion characteristic, the optical fiber will have low but non-zero dispersion across a larger range of wavelengths, thereby expanding the range of operable wavelengths of the optical fiber. Moreover, it would be desirable to provide an optical fiber having a low dispersion characteristic such that the periodically-spaced dispersion-compensating fibers are not required or, if required, are of a lesser required length.

Accordingly, it would be desirable to provide an optical fiber communications link having increased spacing between successive optical amplifiers for reducing system cost and increasing system reliability.

It would be further desirable to provide an optical fiber communications link having increased spacing between successive regenerators for reducing system cost and increasing system reliability.

It would be still further desirable to provide an optical fiber communications link incorporating an optical fiber having reduced attenuation and a dispersion characteristic exhibiting smaller dispersion values across a larger range of wavelengths, and a smaller slope when plotted versus wavelength.

It would be even further desirable to provide an optical fiber communications link requiring fewer dispersion compensating fiber loops.

It would be still further desirable to provide an optical fiber communications link that is operable over a wider range of optical carrier wavelengths, such that overall WDM system bandwidth is increased and/or the cost of WDM optical filtering and optical source components is reduced.

SUMMARY

In accordance with a preferred embodiment, a long-distance, high bit-rate optical communications link is provided comprising an optical transmitter for transmitting an optical signal, an optical receiver for receiving said optical signal, and an index-guiding microstructured optical fiber between the optical transmitter and the optical receiver, the microstructured optical fiber having a microstructured core region with a majority of its cross-sectional area occupied by voids. Preferably, a majority of a collective cross-section of the core and cladding regions is occupied by voids, the voids being elongated and parallel to the center axis of the microstructured optical fiber, the voids having dimensions that are generally small compared to the wavelength of light being transmitted. The voids are dimensioned such that an effective index of refraction of the cladding region is less than an effective index of the core region, the optical fiber thereby propagating light by an index-guiding effect.

The attenuation and dispersion characteristics of the preferred microstructured optical fiber, when expressed in dB/km and ps/(nm-km), respectively, each decrease in approximate proportion to the percentage of cross-sectional area occupied by the voids. In accordance with a preferred embodiment, an appropriate void-to-cross-sectional area ratio may be selected so as to provide an optical communications link that provides substantially increased data throughput using today's pattern of installed base of conduit and communications relay stations. Alternatively, current data throughput rates may be preserved, while system hardware requirements are substantially decreased in terms of regenerator spacing, optical amplifier spacing, dispersion-compensating fiber lengths, optical filtering device precisions, and/or optical source device precisions, thereby decreasing the costs of system construction and maintenance and improving system reliability.

According to one preferred embodiment, an optical communications link is provided using an index-guiding microstructured optical fiber in which at least 50% of a collective cross-section of the core and cladding regions is occupied by voids, the fiber having an attenuation of less than 0.2 db/km and a dispersion magnitude of less than 10 ps/(nm-km) between 1450 nm–1600 nm, the fiber having an attenuation of less than 0.35 db/km and a dispersion magnitude of less than 10 ps/(nm-km) between 1100 nm and 1300 nm. Using this fiber in the currently installed base of 100 km amplifier spacings and 500 km regenerator spacings at conventional WDM wavelengths between 1530–1570 nm with 10 GHz modulators, dispersion-compensating fibers are not required, thereby saving system cost and improving reliability. Alternatively, where regenerators are spaced closer together at 100 km apart, optical amplifiers may be avoided and an expanded range of wavelengths, e.g., 1100–1300 nm and 1450–1600 nm may be used, the wavelength limitations of erbium-doped fiber amplifiers (EDFAs) being entirely avoided. This allows for substantially increased system throughput as well as spectral room for more relaxed channel spacings in WDM systems, thereby allowing for the use of lower precision, lower cost optical filters and optical sources.

In another preferred embodiment, at least 90% of the collective cross-section of the core and cladding regions of the index-guiding microstructured optical fiber is occupied by voids, the fiber having an attenuation of less than 0.04 db/km and a dispersion magnitude of less than 2 ps/(nm-km) between 1450 nm–1600 nm, the fiber having an attenuation of less than 0.07 db/km and a dispersion magnitude of less than 2 ps/(nm-km) between 1100 nm and 1300 nm. Advantageously, using this fiber in the above currently installed base, neither optical amplifiers nor dispersion-compensating fibers are required, and only the regenerators at 500 km spacings are needed using WDM wavelengths in a range of 1450–1600 nm with 10 GHz modulators. Alternatively, where regenerators are spaced closer together at 250 km apart, an even greater range of wavelengths, e.g., both 1100–1300 nm and 1450–1600 nm, may be used since EDFAs are not required. Even further, with the addition of dispersion-compensating fibers, greater modulation rates (e.g., 40 Gbps) may be used in systems with comparable distances between regenerators, with EDFAs still not being required. Also, the increased range of usable wavelengths allows for wider WDM channel spacings and the use of lower precision, lower cost optical filters and optical sources, thereby lowering system costs and increasing system reliability.

DETAILED DESCRIPTION

Figure 4:
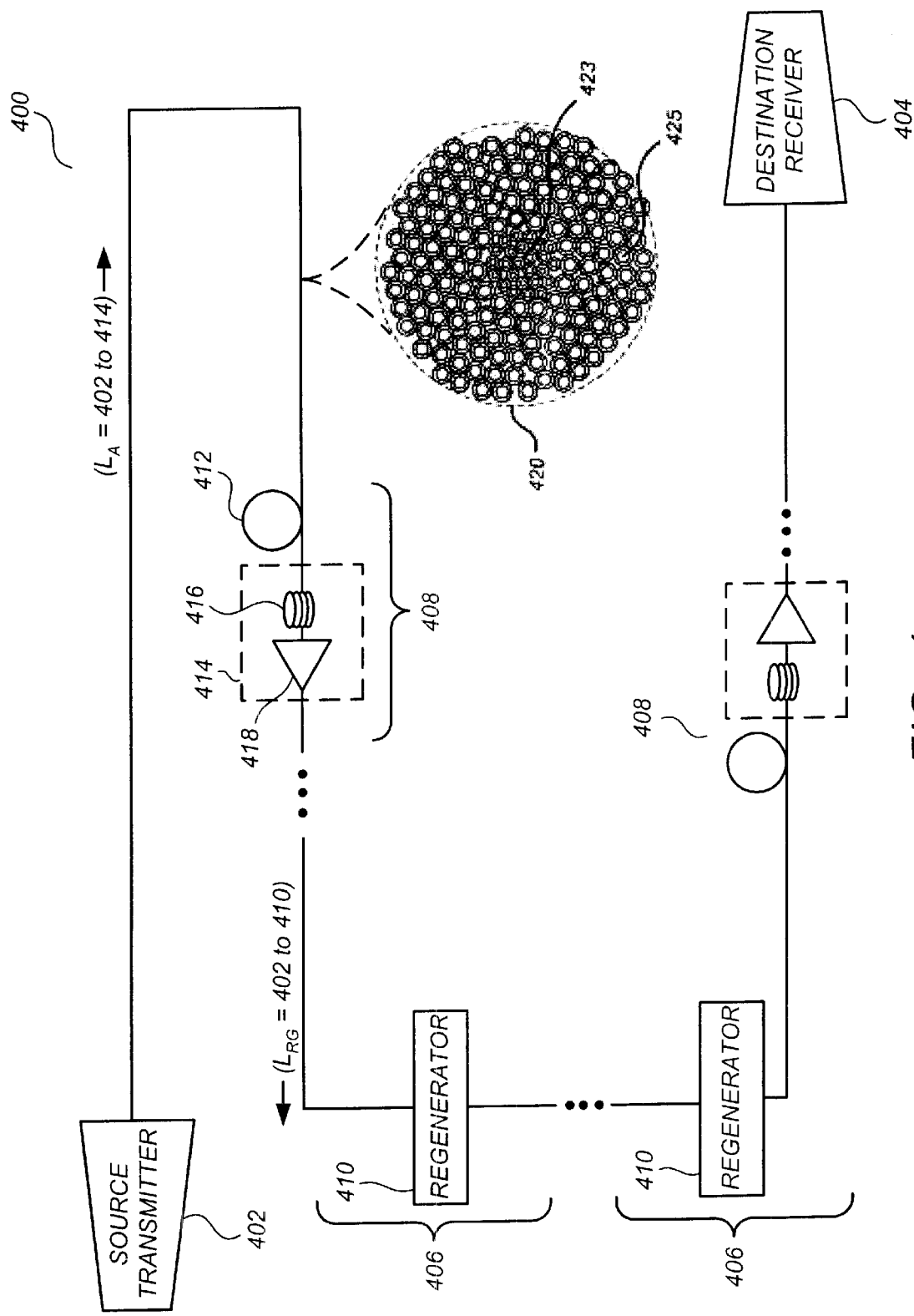
FIG. 4 illustrates an optical fiber communications link in accordance with a preferred embodiment.

FIG. 4 illustrates an optical fiber communications link 402 in accordance with a preferred embodiment, comprising a source transmitter 402, a destination receiver 404, and at least one fiber span 412 therebetween, fiber span 412 comprising an index-guiding microstructured optical fiber 420. A cross-section of index-guiding microstructured optical fiber 420 is illustrated in FIG. 4, comprising a core region 423 surrounded by a cladding region 425, wherein a majority of the cross-sectional area of the core region is occupied by voids. Preferably, a majority of a collective cross-section of the core region 423 and cladding regions 425 is occupied by voids. The voids are elongated and parallel to the center axis of the microstructured optical fiber, and have dimensions that are generally small compared to the wavelength of light being transmitted. The voids are dimensioned such that the effective index of refraction of the cladding region 425 is less than an effective index of the core region 423, the optical fiber thereby propagating light by an index-guiding effect. According to a preferred embodiment, the optical fiber 420 is similar to that described in Ser. No. 09/591,474, supra.

Optical fiber communications link 402 further comprises a plurality of regeneration spans 406, but importantly the components thereof including optical amplifiers, dispersion-compensating fibers, and regenerators may be optional depending on the distance between source transmitter 402 and destination receiver 404, the percentage of cross-sectional area of the optical fiber 420 occupied by voids, the modulation rate, and the desired set of usable wavelengths. If parameters are selected in which all such components are required, each regeneration span 406 comprises a plurality of amplifier spans 408 and a regenerator 410. Each amplifier span 408 comprises fiber span 412 and an amplifier station 414 that houses a dispersion-compensating fiber loop 416 and an optical amplifier 418, with a length $L_A$ representing the length of the fiber span 412.

Figure 1:
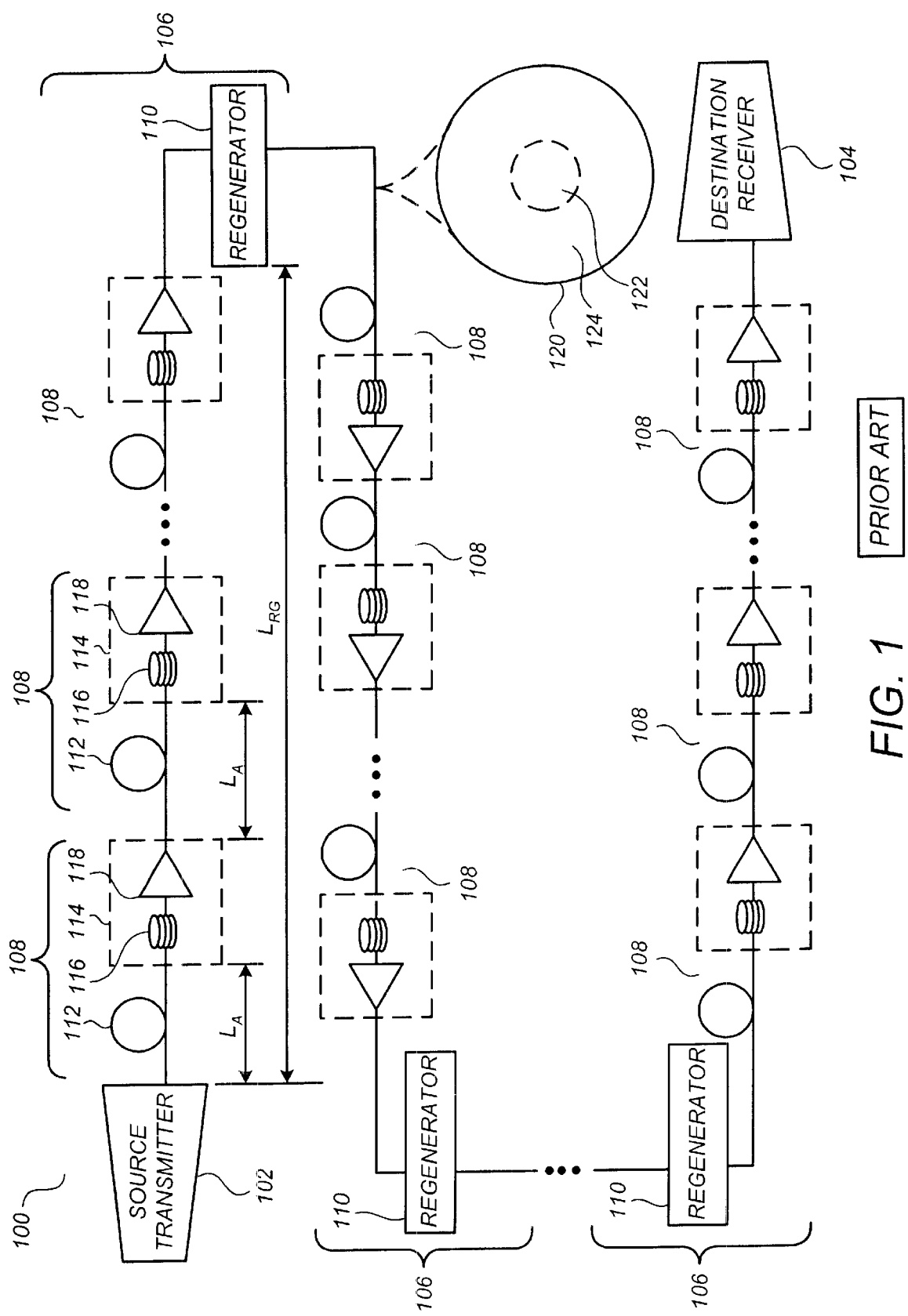
FIG. 1 illustrates a prior art optical fiber communications link.
Figure 2:
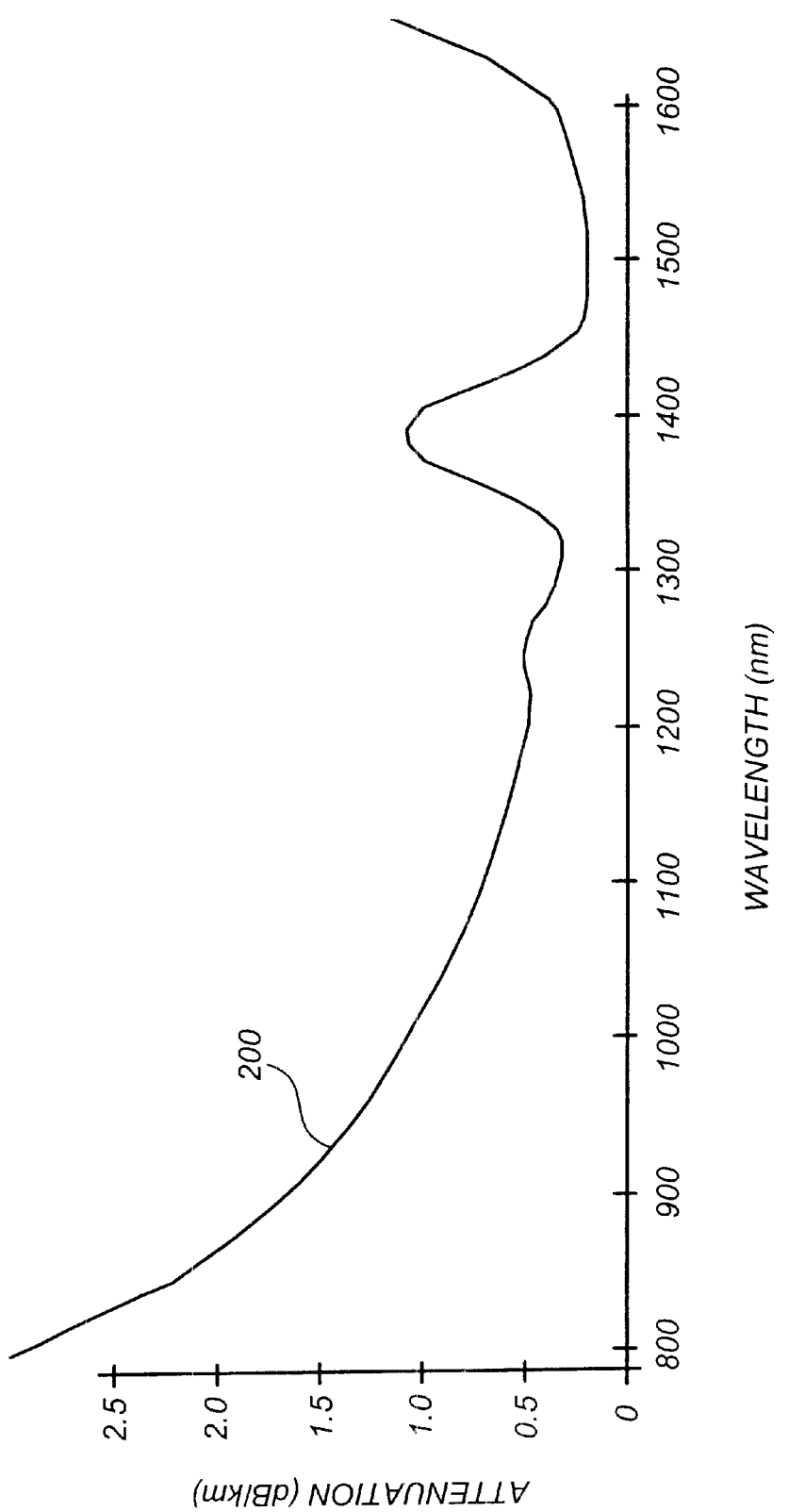
FIG. 2 illustrates an attenuation plot of a prior art optical fiber.

It has been found that the attenuation and dispersion characteristics of the preferred index-guiding microstructured optical fiber 420, when expressed in dB/km and ps/(nm-km), respectively, each decrease in approximate proportion to the percentage of cross-sectional area occupied by the voids. Thus, for example, where a conventional solid-core optical fiber is characterized by an attenuation function $\alpha(\lambda)$ in dB/km (e.g., plot 200 of FIG. 2), the index-guiding microstructured optical fiber 420 is characterized by an attenuation function $\alpha_M(\lambda)$ given by Eq.(3) below, where M is the percentage of cross-sectional area occupied by the voids and $\alpha_M(\lambda)$ is also expressed in dB/km:

$$\alpha_M(\lambda) = (1-M)\alpha(\lambda) \quad \{3\}$$

Figure 3:
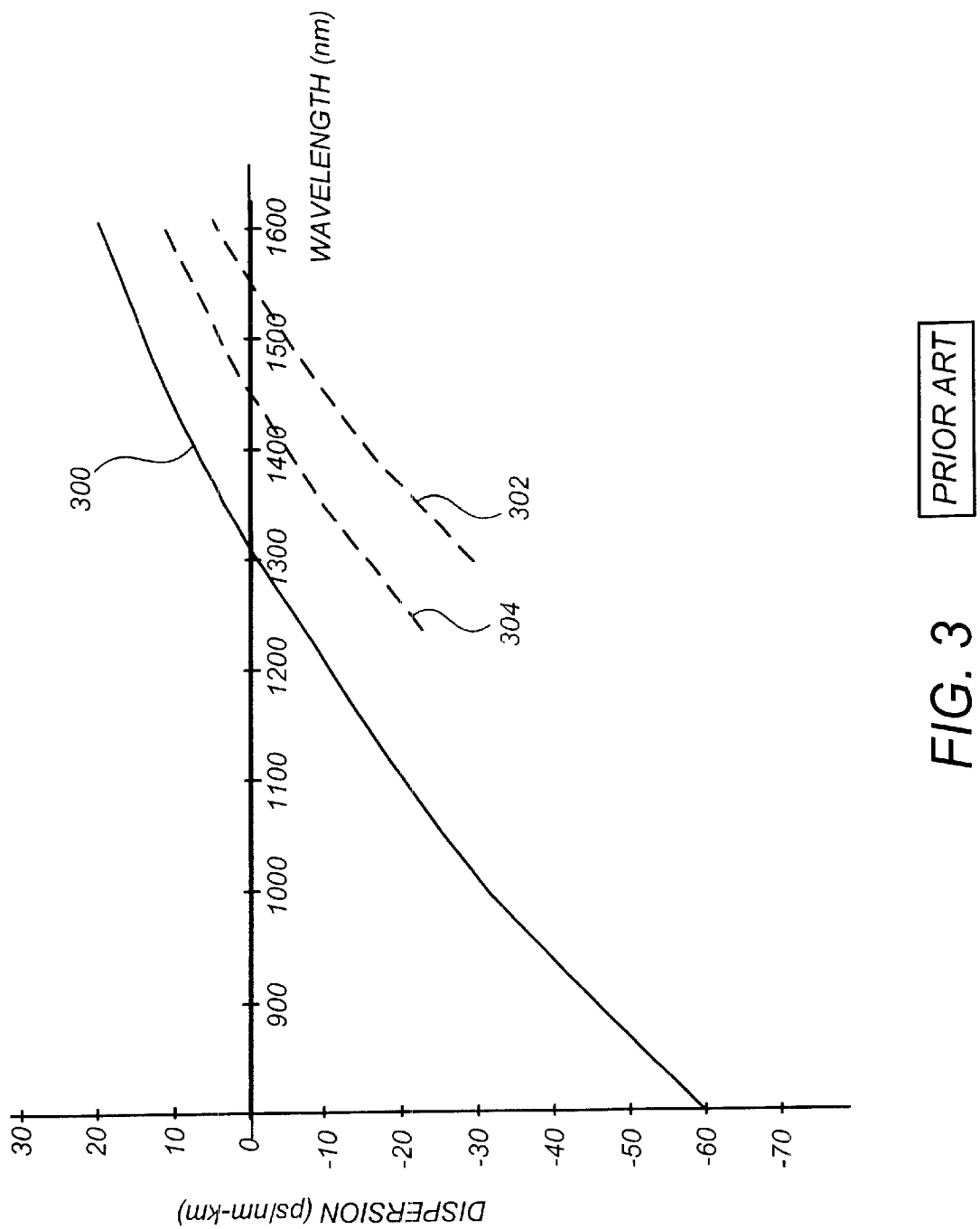
FIG. 3 illustrates a dispersion plot of a prior art optical fiber.
Figure 5:
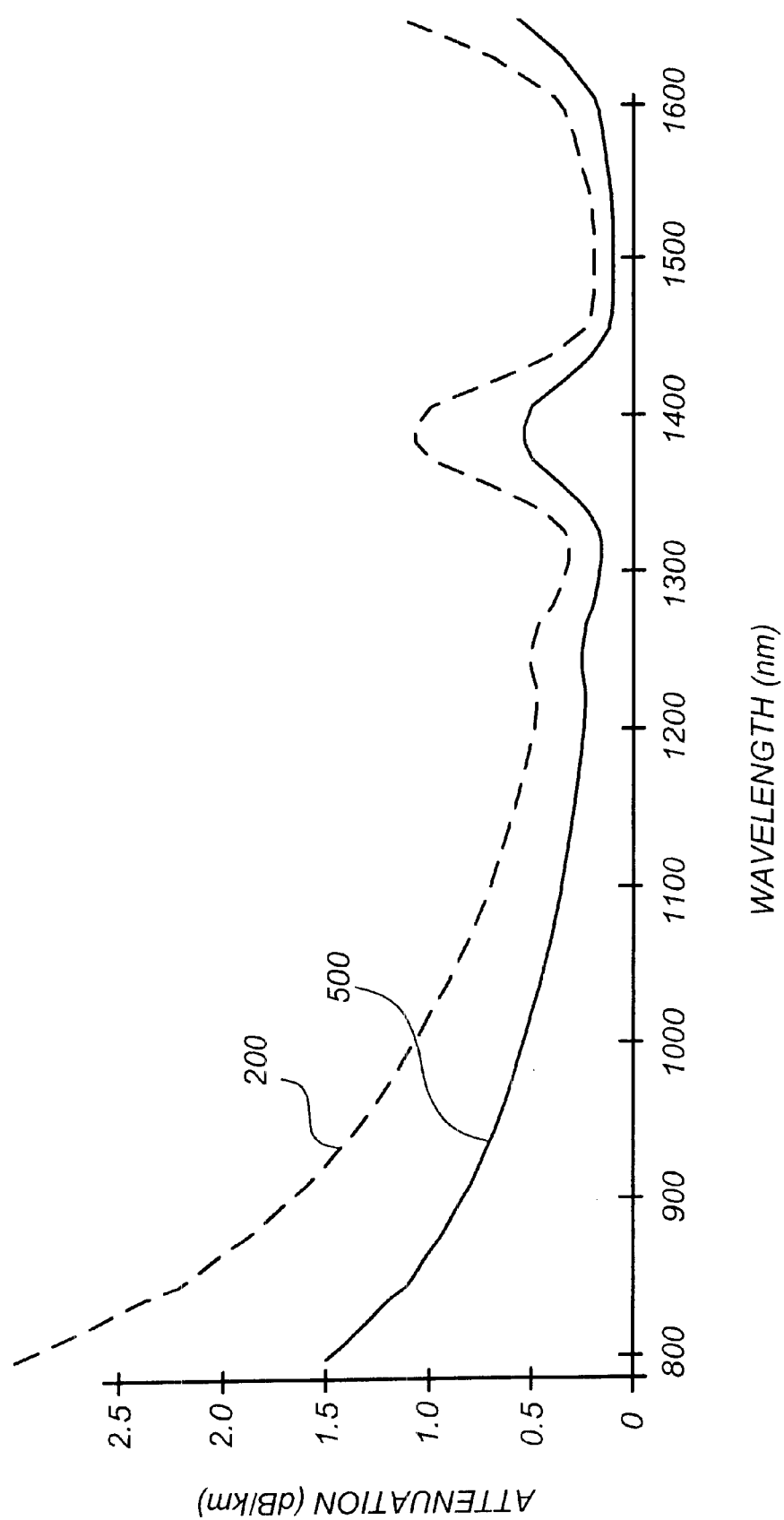
FIG. 5 illustrates an attenuation plot of an index-guiding microstructured optical fiber in accordance with a preferred embodiment.
Figure 6:
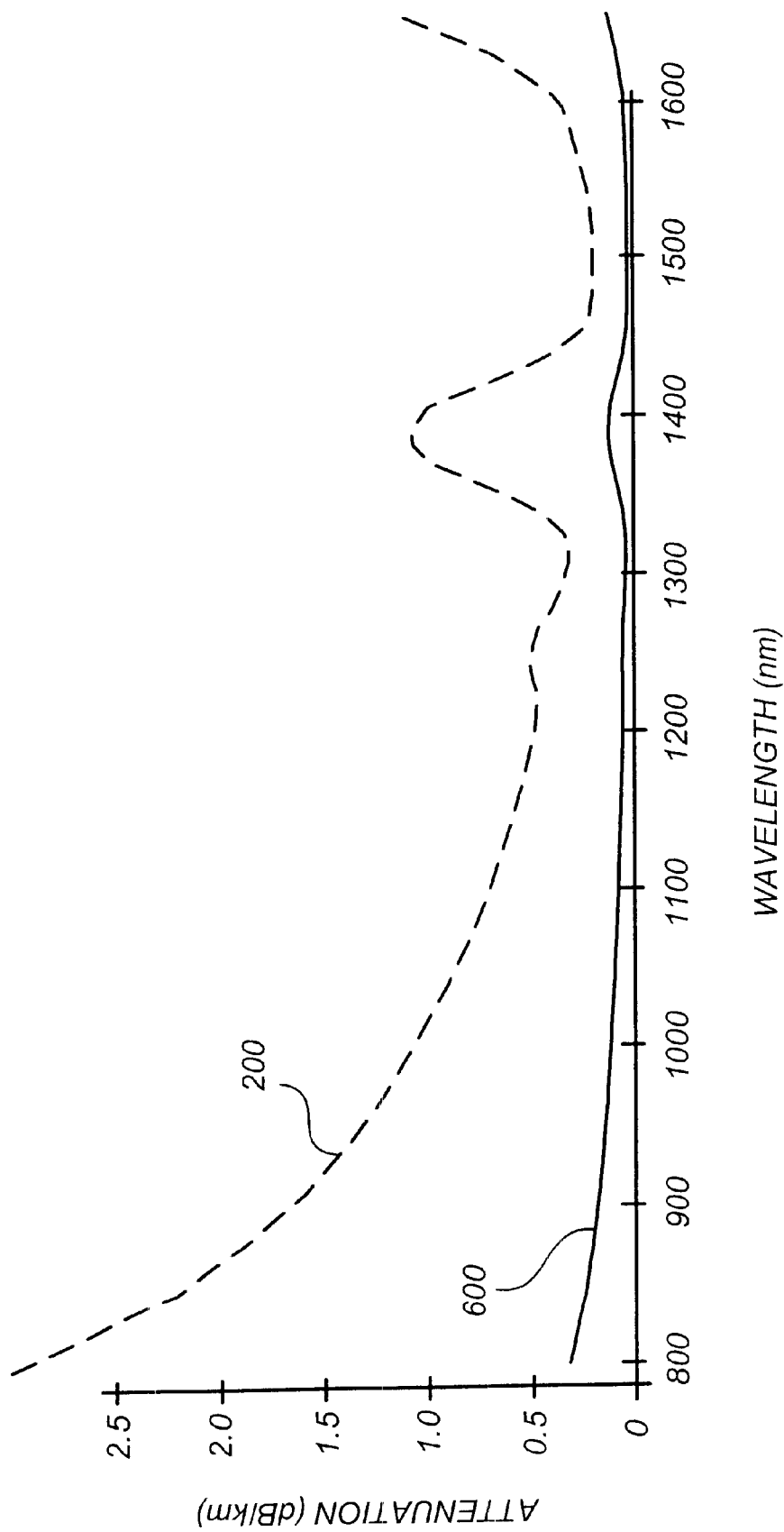
FIG. 6 illustrates an attenuation plot of an index-guiding microstructured optical fiber in accordance with a preferred embodiment.

FIGS. 5 and 6 show plots 500 and 600 of $\alpha_M(\lambda)$ with M=50% and 90%, respectively. Likewise, where a conventional solid-core optical fiber is characterized by a dispersion function $d(\lambda)$ in ps/(nm-km) (e.g., plot 300 of FIG. 3), the index-guiding microstructured optical fiber 420 is characterized by a dispersion function $d_M(\lambda)$ given by Eq.(4) below, where $d_M(\lambda)$ is also expressed in ps/(nm-km):

$$d_M(\lambda) = (1-M)d(\lambda) \quad \{4\}$$

Figure 7:
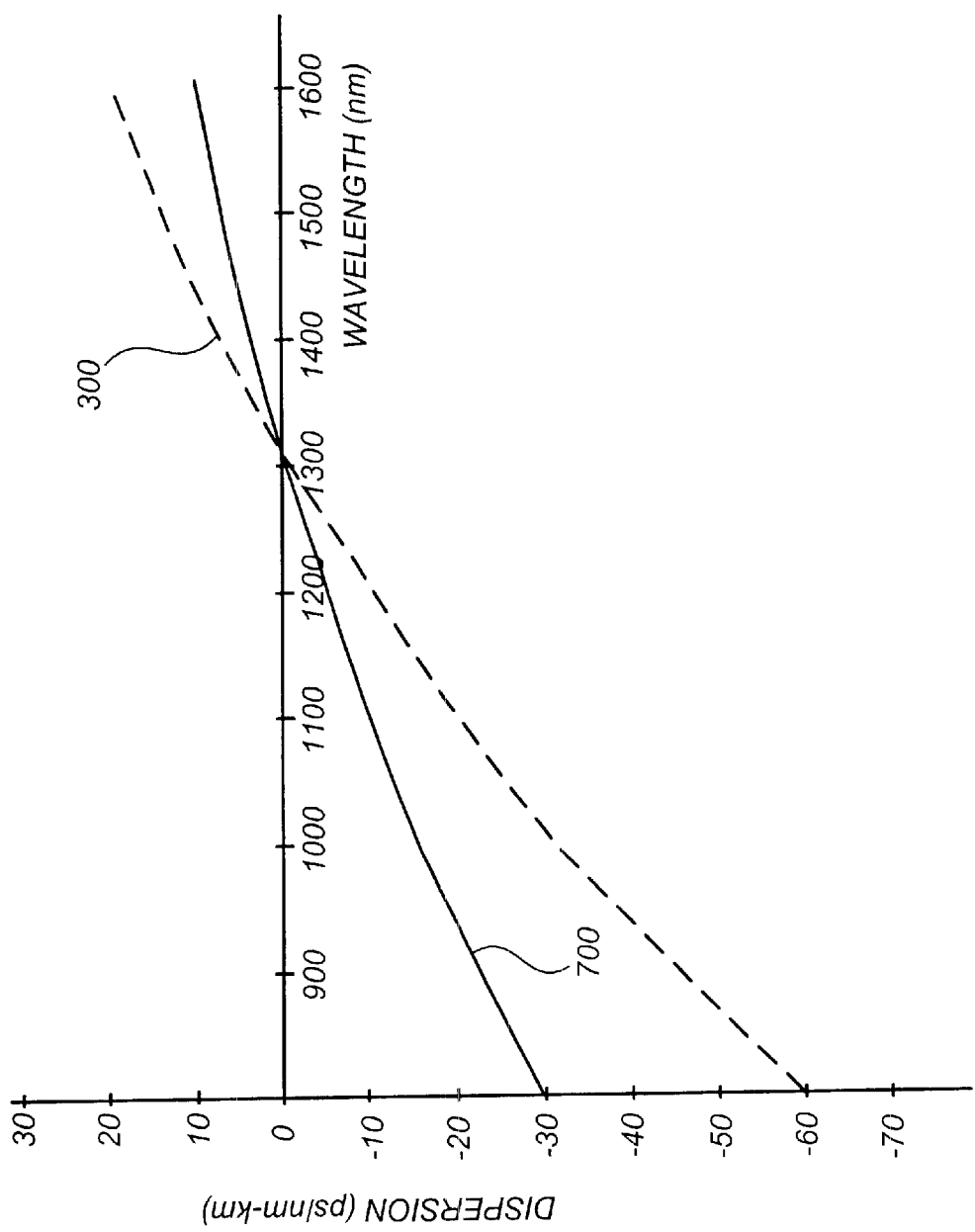
FIG. 7 illustrates a dispersion plot of an index-guiding microstructured optical fiber in accordance with a preferred embodiment.
Figure 8:
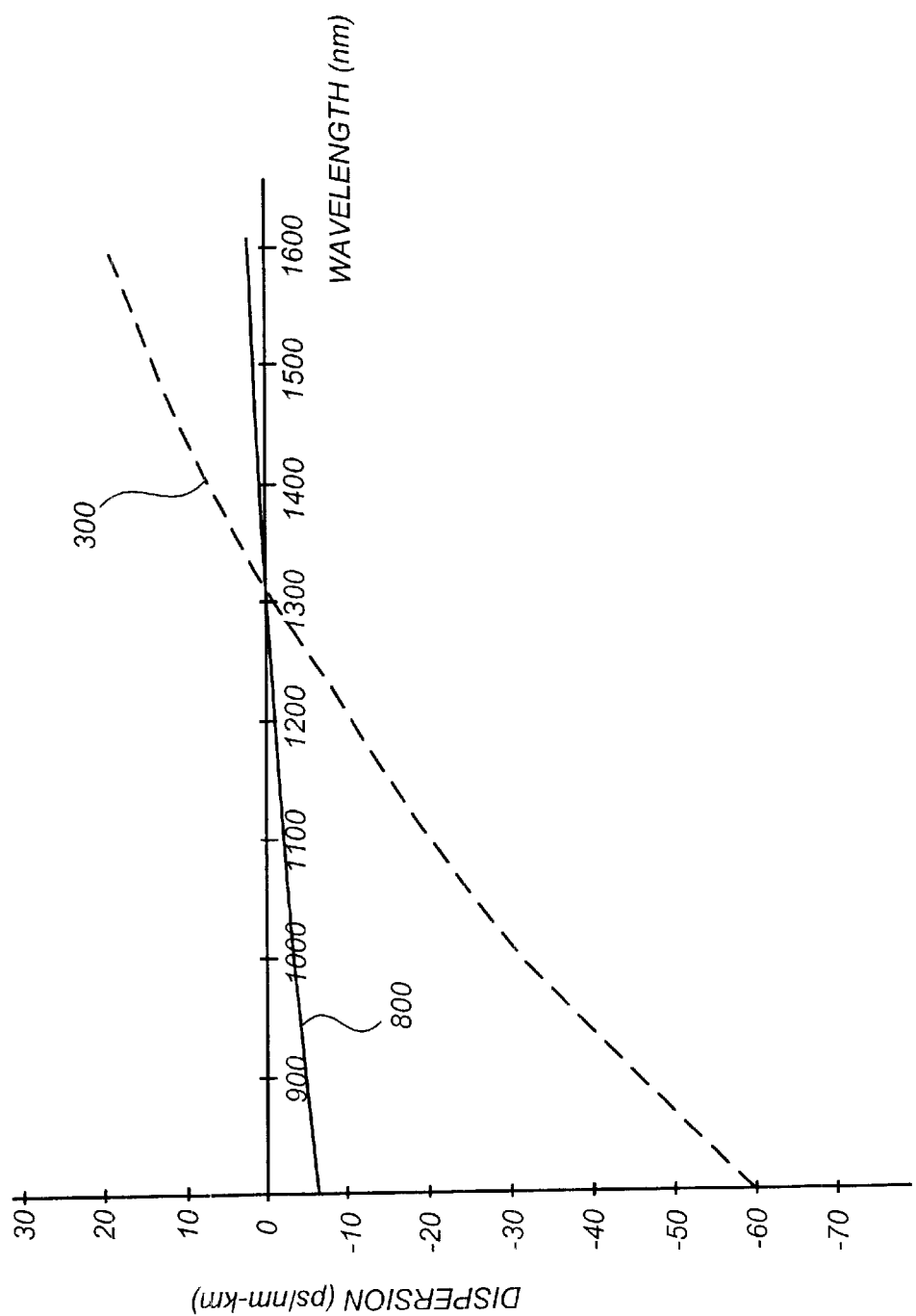
FIG. 8 illustrates a dispersion plot of an index-guiding microstructured optical fiber in accordance with a preferred embodiment.

FIGS. 7 and 8 show plots 700 and 800 of $d_M(\lambda)$ with M=50% and 90%, respectively. As reflected in FIGS. 5–8, an optical communications link in accordance with the preferred embodiments uses an optical fiber in which the primary cause of attenuation and dispersion—the presence of the silica glass material in the fiber—is substantially removed, and these effects are thereby substantially reduced. In accordance with a preferred embodiment, an appropriate void-to-cross-sectional area ratio M may be selected so as to provide an optical communications link that provides substantially increased data throughput using today's installed base of conduit and communications relay stations. Alternatively, current data throughput rates may be preserved, while system hardware requirements are substantially decreased in terms of regenerator spacing, optical amplifier spacing, dispersion-compensating fiber lengths, optical filtering device precisions, and/or optical source device precisions, thereby decreasing the costs of system construction and maintenance and improving system reliability.

It is to be appreciated that the exemplary values disclosed infra for various link distances, regenerator distances, amplifier spacings, dispersion-compensating fiber loops, bandwidths, etc., are given by way of nonlimiting example. It is to be further appreciated that a person skilled in the art could readily, in light of the present disclosure, construct communication links having a variety of different such link distances, regenerator distances, amplifier spacings, dispersion-compensating fiber loops, bandwidths, etc., within the scope of the preferred embodiments.

Tables 1 and 2 below summarize the attenuation limits and uncompensated dispersion limits, respectively, for microstructured optical fiber 420. For void-to-cross-section ratios of 50% and 90% and for wavelengths between 800 nm and 1600 nm, Table 1 summarizes the maximum distance $L_A$ yielded by Eq. (1), supra, that a standard 0 dBm optical signal can travel down the fiber and be reliably detected by an optical detector for modulation rates of 2.5 Gbps (where a standard optical receiver will have a sensitivity of about −25 dBm), 10 Gbps (where a standard optical receiver will have a sensitivity of about −20 dBm), and 40 Gbps (where a standard optical receiver will have a sensitivity of about −15 dBm). For these same void-to-cross-section ratios and optical signal wavelengths, Table 2 summarizes the maximum length of uncompensated fiber $L_{RG}$ yielded by Eq. (2), supra, for which symbols modulated onto optical signals at 2.5 Gbps, 10 Gbps, and 40 Gbps, respectively, may propagate down the uncompensated fiber before being indistinguishably merged together due to group delay. Practically speaking, Table 2 represents the maximum regenerator spacing permitted if dispersion-compensating fibers are not used.

TABLE 1

Attenuation Limits ($P_t$ = 0dBm)

| Void | Wavelength (nm) | Attenuation (dB/km) | 2.5 Gbps Limit in km ($P_r$ = −25 dB) | 10 Gbps Limit in km ($P_r$ = −20 dB) | 40 Gbps Limit in km ($P_r$ = −15 dB) |
|---|---|---|---|---|---|
| 50% | 800 | 1.50 | 17 | 13 | 10 |
| " | 900 | 0.84 | 30 | 24 | 18 |
| " | 1000 | 0.53 | 47 | 38 | 28 |
| " | 1100 | 0.31 | 82 | 66 | 49 |
| " | 1200 | 0.35 | 71 | 57 | 43 |
| " | 1300 | 0.18 | 143 | 114 | 86 |
| " | 1400 | 0.26 | 98 | 78 | 59 |
| " | 1500 | 0.10 | 263 | 211 | 158 |
| " | 1530 | 0.10 | 250 | 200 | 150 |
| " | 1550 | 0.12 | 208 | 167 | 125 |
| " | 1570 | 0.14 | 185 | 148 | 111 |
| " | 1600 | 0.19 | 132 | 105 | 79 |
| 90% | 800 | 0.30 | 83 | 67 | 50 |
| " | 900 | 0.17 | 149 | 119 | 89 |
| " | 1000 | 0.11 | 236 | 189 | 142 |
| " | 1100 | 0.06 | 410 | 328 | 246 |
| " | 1200 | 0.07 | 357 | 286 | 214 |
| " | 1300 | 0.04 | 714 | 571 | 429 |
| " | 1400 | 0.05 | 490 | 392 | 294 |
| " | 1500 | 0.02 | 1316 | 1053 | 789 |
| " | 1530 | 0.02 | 1250 | 1000 | 750 |
| " | 1550 | 0.02 | 1042 | 833 | 625 |
| " | 1570 | 0.03 | 926 | 741 | 556 |
| " | 1600 | 0.04 | 658 | 526 | 395 |

TABLE 2

Dispersion Limits (Uncompensated)

| Void % | Wavelength (nm) | Dispersion (ps/nm-km) | 2.5 Gbps Limit in km | 10 Gbps Limit in km | 40 Gbps Limit in km |
|---|---|---|---|---|---|
| 50% | 800 | −30.00 | 533 | 33 | 2 |
| " | 900 | −22.50 | 711 | 44 | 3 |
| " | 1000 | −15.50 | 1032 | 65 | 4 |
| " | 1100 | −10.00 | 1600 | 100 | 6 |
| " | 1200 | −5.50 | 2909 | 182 | 11 |
| " | 1300 | −0.50 | 32000 | 2000 | 125 |
| " | 1400 | 3.50 | 4571 | 286 | 18 |
| " | 1500 | 6.50 | 2462 | 154 | 10 |
| " | 1530 | 7.50 | 2133 | 133 | 8 |
| " | 1550 | 8.50 | 1882 | 118 | 7 |
| " | 1570 | 9.00 | 1778 | 111 | 7 |
| " | 1600 | 10.00 | 1600 | 100 | 6 |

TABLE 2-continued

Dispersion Limits (Uncompensated)

| Void % | Wavelength (nm) | Dispersion (ps/nm-km) | 2.5 Gbps Limit in km | 10 Gbps Limit in km | 40 Gbps Limit in km |
|---|---|---|---|---|---|
| 90% | 800 | −6.00 | 2667 | 167 | 10 |
| " | 900 | −4.50 | 3556 | 222 | 14 |
| " | 1000 | −3.10 | 5161 | 323 | 20 |
| " | 1100 | −2.00 | 8000 | 500 | 31 |
| " | 1200 | −1.10 | 14545 | 909 | 57 |
| " | 1300 | −0.10 | 160000 | 10000 | 625 |
| " | 1400 | 0.70 | 22857 | 1429 | 89 |
| " | 1500 | 1.30 | 12308 | 769 | 48 |
| " | 1530 | 1.50 | 10667 | 667 | 42 |
| " | 1550 | 1.70 | 9412 | 588 | 37 |
| " | 1570 | 1.80 | 8889 | 556 | 35 |
| " | 1600 | 2.00 | 8000 | 500 | 31 |

As a first example, using a 50%-void microstructured optical fiber, a 10 Gbps modulation rate, and a desired wavelength range of 1500 nm–1600 nm, Tables 1 and 2 show an attenuation limit of 105 km and a dispersion limit of 100 km. Accordingly, an optical communication link in which regenerators are spaced 100 km apart may be constructed. No optical amplifiers or dispersion-compensating fibers would be required. Such a system could transmit up to 250 wavelength-division-multiplexed signals spaced apart by 0.4 nm, whereby the optical communications link would be capable of a data throughput up to 2.50 Tbps. Alternatively, such a system could transmit up to 25 wavelength-division-multiplexed signals spaced apart by a much more relaxed spacing of 4.0 nm, whereby the optical communications link would still have a very high data throughput of up to 250 Gbps. However, with these channel spacings of 4.0 nm (equivalent to about 500 GHz), substantially lower precision, lower cost optical sources and filtering equipment may be used, thereby reducing system cost and ease of construction.

Figure 9:
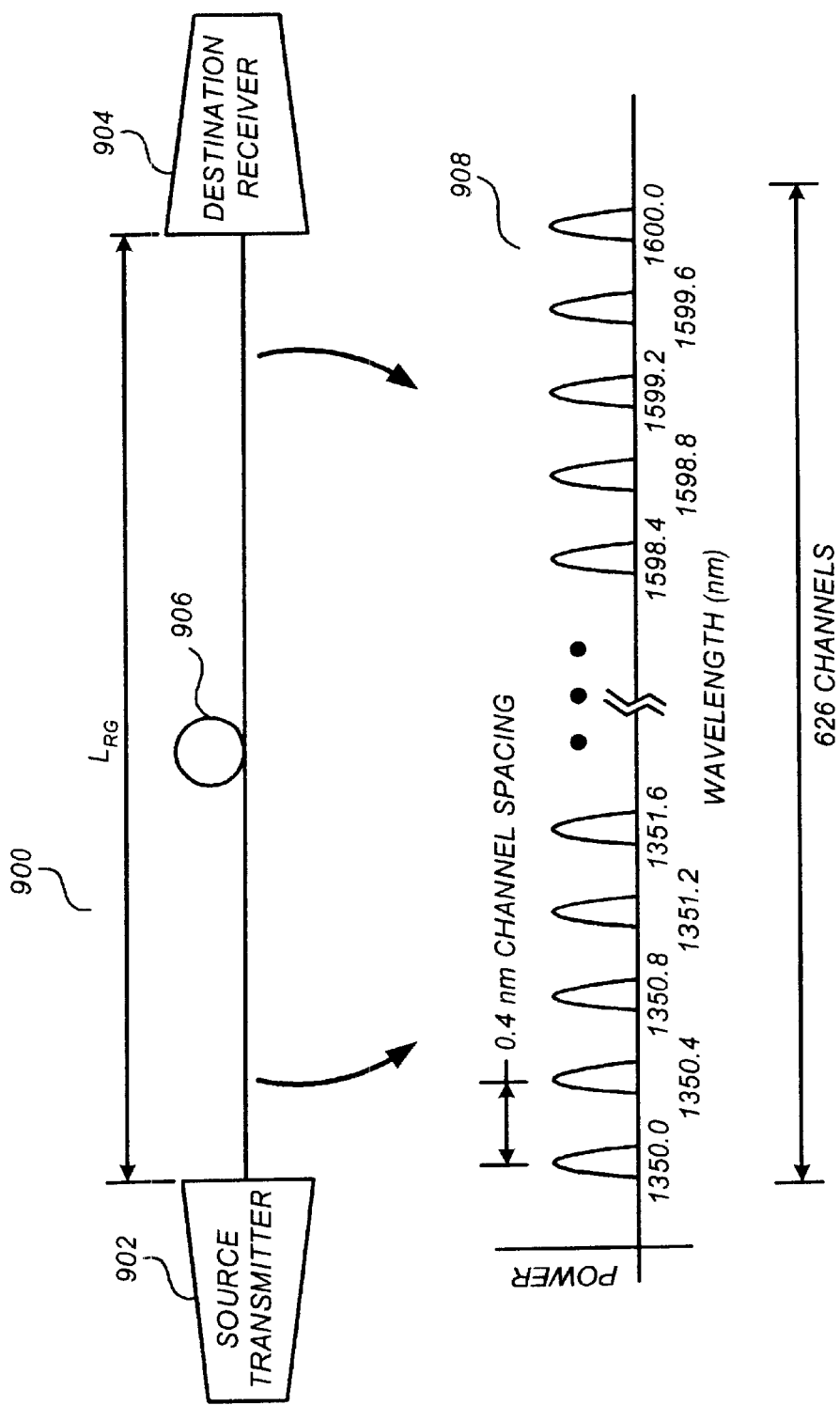
FIG. 9 illustrates an optical fiber communications link and a spectral plot of a wavelength-division multiplexed signal being transmitted thereon in accordance with a preferred embodiment.

FIG. 9 illustrates an exemplary optical communications link 900 in accordance with a preferred embodiment. Using a 90%-void microstructured optical fiber, a 10 Gbps modulation rate, and a desired wavelength range of 1350 nm–1600 nm, Tables 1 and 2 show an attenuation limit well above 350 km and a dispersion limit of 500 km. Accordingly, an optical communication link in which regenerators are spaced by a distance $L_{RG}$=300 km apart may be constructed, and again no optical amplifiers or dispersion-compensating fibers would be required. It is to be appreciated that while FIG. 9 shows a source transmitter 902 coupled directly over a fiber span 906 to a destination receiver 904, the destination receiver 904 may simply be a front end of a regenerator in a longer optical communications link. Advantageously, the wider wavelength range of 1350 nm–1600 nm is permitted because, since no EDFAs are required, there is no need to be constrained to the narrow 1530–1570 nm band within which EDFAs operate.

As shown by a spectral plot 908 in FIG. 9, the optical communications link 900 could transmit up to 250 wavelength-division-multiplexed signals spaced apart by 0.4 nm, whereby the optical communications link would be capable of a data throughput up to 2.50 Tbps. This constitutes a substantial increase in the number of channels and overall data throughput in relation to convention WDM systems.

Figure 10:
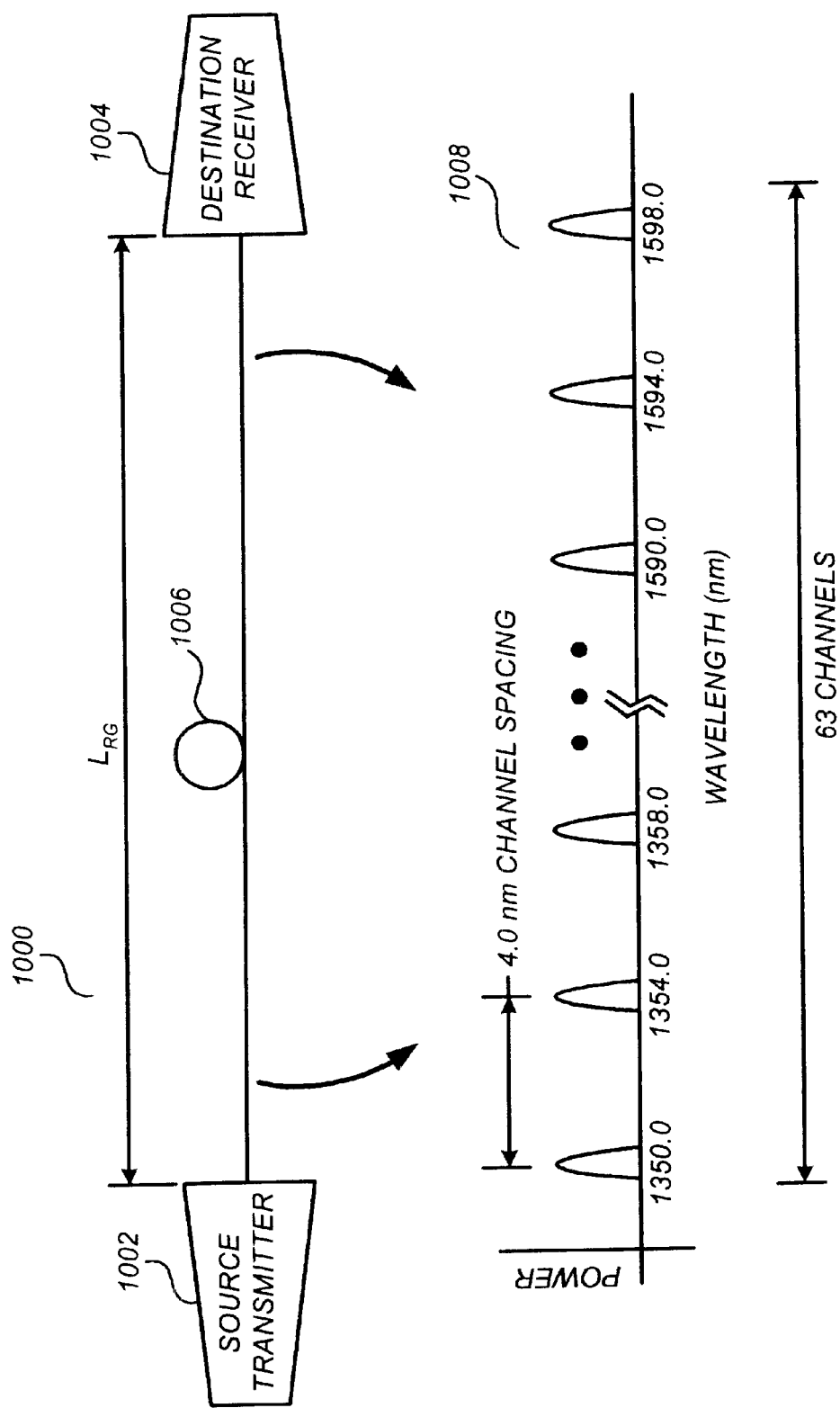
FIG. 10 illustrates an optical fiber communications link and a spectral plot of a wavelength-division multiplexed signal being transmitted thereon in accordance with a preferred embodiment.

FIG. 10 shows an exemplary optical communications link 1000 in accordance with a preferred embodiment. The system of FIG. 10 is similar to the system of FIG. 9, except that substantially greater inter-channel spacings are used in the WDM link, in particular, 4.0 nm spacing in FIG. 10 as opposed to 0.4 nm spacing in FIG. 9. The optical communications link 1000 can transmit up to 25 WDM channels spaced apart by the much more relaxed spacing of 4.0 nm, the optical communications link 1000 still having a very high data throughput of up to 250 Gbps. While this number of channels and overall data rate is comparable to conventional WDM systems, the relaxed channel spacings (about 500 GHz) allow for the use of substantially lower precision, lower cost filtering devices and optical source devices, thereby reducing system cost and ease of construction.

In accordance with another preferred embodiment, dispersion-compensating fibers may be used in conjunction with the index-guiding microstructured optical fiber to further increase the distance between regenerators when very high modulation rates (such as 40 Gbps) are desired. In accordance with a preferred embodiment, dispersion-compensating fibers similar to those described in Ser. No. 09/781,353 U.S. Pat. No. 6,512,871 supra, are used to reduce reflections due to mismatches in effective indices of refraction between the optical fiber spans and the dispersion-compensating fibers. Additionally, such dispersion-compensating fibers have a high negative dispersion such that reduced loop lengths are required, thereby reducing overall attenuation. For simplicity of explanation, however, a system using a conventional dispersion-compensating fiber having a dispersion of −200 ps/(nm-km) and an attenuation of 0.5 dD/km is used below. In accordance with another preferred embodiment, optical transformers similar to those described in Ser. No. 09/781,341, supra, are used to couple the fiber span to the dispersion-compensating fibers to further reduce or to substantially eliminate reflections due to refractive index mismatches.

In one example of an optical communications system using a 50%-void index-guiding microstructured fiber, a desired operation range of 1500 nm–1550 nm, and a 40 Gbps modulation rate, the attenuation limitation from Table 1 is 125 km, while the uncompensated dispersion limitation is only 7 km from Table 2. The specific maximum dispersion value D in this range is 8.5 ps/km-nm. Using a dispersion-compensating fiber, however, the overall fiber distance between source transmitter 402 and destination receiver 404 can be placed at 100 km. This is possible because, using Eq. (2), an amount of dispersion compensating fiber $1_d$, having a dispersion of −200 ps/km-nm required to bring the dispersion down to an acceptable level for that data rate would need to satisfy the equation $40^2(100D-200\ 1_d)=10^2(50)(20)$ which, using D=8.5 ps/km-nm results in $1_d$=3.94 km. This, in turn, would only cause an additional 1.47 dB of loss, which is acceptable because the overall attenuation would be 13.47 dB, which is less than the receiver sensitivity limit that allow 15 dB loss at 40 GHz using conventional optical receivers.

In a second example in which an optical communications system using a 90%-void index-guiding microstructured fiber, a desired operation range of 1450 nm–1600 nm, and a 40 Gbps modulation rate, the attenuation limitation from Table 1 is 395 km, while the uncompensated dispersion limitation is only 31 km from Table 2. The specific maximum dispersion value D in this range is 2.0 ps/km-nm. However, using a dispersion-compensating fiber, the overall fiber distance between source transmitter 402 and destination receiver 404 can be placed at 300 km. This is possible because, using Eq. (2), an amount of dispersion compensating fiber $I_d$, having a dispersion of −200 ps/km-nm required to bring the dispersion down to an acceptable level for that data rate would need to satisfy the equation $40^2(300D-200 1_d)=10^2(50)(20)$ which, using D=2.0 ps/km-nm results in $1_d=2.68$ km. This, in turn, would only cause an additional 1.34 dB of loss, which is acceptable because the overall attenuation would be 12.8 dB, which is less than the receiver sensitivity limit that allow 15 dB loss at 40 GHz using conventional optical receivers.

Accordingly, while substantial improvements using the preferred index-guiding microstructured optical fiber may be realized without the use of dispersion-compensating fibers, at very high modulation rates the use of dispersion-compensating fibers in conjunction with the index-guiding microstructured optical fiber provides even further improvements. Advantageously, because the attenuation limitations are substantially relaxed with the preferred index-guiding microstructured optical fiber, the increases in attenuation due to the dispersion-compensating fibers are well tolerated.

The preferred index-guiding microstructured optical fiber may be fabricated using methods similar to those described in Ser. Nos. 09/591,474 U.S. Pat. No. 6,418,258 and 09/781,343, supra. In the fabrication of the index-guiding microstructured optical fiber, it is preferable that the voids have smooth walls to avoid scattering of light due to wall roughness. In addition, it is preferable that the index-guiding microstructured optical fiber comprise pure, non-doped silica having at least the same quality as existing silica materials that are used in current state-of-the-art optical fibers. According to a preferred embodiment, it is variations in the void-to-cross-section ratio between the core and cladding regions that primarily achieves the required difference in their effective refractive indices. Accordingly, it is not required that dopants such as $GeO_2$, $P_2O_5$, etc. be used to vary the refractive indices of these regions. Advantageously, since particulates, composition and density fluctuations that are less than the wavelength of light will cause Rayleigh scattering, the preferred index-guiding microstructured optical fiber will not suffer from additional Rayleigh scattering from the use of dopants.

It is to be appreciated, however, that the scope of the preferred embodiments is not limited to the use of an index-guiding microstructured optical fiber comprising pure, non-doped silica. For example, in one preferred embodiment, the void-to-cross-section ratio of the core and cladding regions may be identical, with dopants differently introduced to vary their effective indices of refraction. In other preferred embodiment, combinations of different void-to-cross-section ratios and different dopant concentrations may be used to vary the effective indices of refraction of the core and cladding regions.

According to a preferred embodiment, in those configurations in which optical amplifiers such as erbium-doped fiber amplifiers (EDFAs) are used in the optical communications link, a microstructured index-matching element such as that described in Ser. No. 09/781,341 is used to couple the index-guiding microstructured optical fiber to the optical amplifier. Because EDFAs comprise solid-cross-section optical fibers, their index of refraction may be substantially greater than that of the index-guiding microstructured optical fiber, which may cause unwanted reflections. At a first end, the microstructured index-matching element is microstructured, having a void-to-cross-section ratio similar to that of the index-guiding microstructured optical fiber. The void-to-cross-section ratio is gradually reduced until the index of refraction matches that of the EDFA fiber at a second end, thereby providing an adiabatic transition.

More generally, microstructured index-matching elements may also be adapted to couple standard optical fibers or dispersion-compensating fibers to the index-guiding microstructured optical fiber. According to a preferred embodiment in which dispersion compensating fibers similar to those described in Ser. No. 09/781,353 are used in which there are a number voids in the cross-section, the microstructured index-matching element has void-to-cross-section ratio similar to the dispersion-compensating fiber at the second end.

The use of the preferred index-guiding microstructured optical fiber in an optical communications link provides a variety of advantages in addition to those described above. For example, as indicated in FIGS. 6 and 8, the index-guiding microstructured optical fiber 420 also has very low attenuation and dispersion in the sub-1100 nm wavelength range. Although prior art solid-core optical fibers are not single-mode in this range, the index-guiding microstructured optical fiber may indeed be adapted to be single-mode in this range by using a proper void-to-cross-section geometry between the core region and the cladding region such as that described in Ser. No. 09/781,352, supra.

Also according to a preferred embodiment and as described in Ser. No. 09/781,352, supra, a proper void-to-cross-section geometry between the core region and the cladding region may be selected such that, in standard WDM wavelength ranges, the core diameter of the index-guiding microstructured optical fiber 420 may be made substantially larger than those of prior art solid-cross-section optical fibers. This, in turn, will relax the coupling requirements for coupling the index-guiding microstructured optical fiber to other optical components, thereby reducing the cost of packaging of single-mode optical components. In addition, higher optical power may be propagated in fibers with larger core diameters since the larger core diameter reduces the power density therein. By way of nonlimiting example, whereas typical solid-core optical fibers require core diameters of about 10 $\mu$m or less, the core size of index-guiding microstructured optical fiber 420 may be increased to 20 $\mu$m where the void-to-cross-section ratio is set to 95.9% and 96.7% in the core and cladding regions, respectively.

As a further advantage of using the preferred index-guiding microstructured optical fiber, splicing operations have substantially relaxed tolerances as compared to other prior art fibers having one or more voids in their cross-section such as photonic bandgap (PBG) fibers. As known in the art, the voids in PBG fibers must be aligned precisely when two fibers are coupled together, or else significant splicing losses of 0.1 dB or greater may be incurred. This is due to the fact that precise alignment and spacing of the voids is crucial to light propagation by the photonic bandgap effect. In contrast, the preferred index-guiding microstructured optical fiber does not "see" each individual void, but rather "sees" only an effective index of refraction because the dimensions of the microstructures are small compared to the wavelength of the light being transmitted. Accordingly, splicing tolerances in the preferred index-guiding microstructured optical fiber are substantially relaxed.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments are not intended to limit their scope, which is limited only by the scope of the claims set forth below.

What is claimed is:

1. An optical communications link, comprising:
an optical transmitter for transmitting an optical signal;
an optical receiver for receiving said optical signal; and
an index-guiding optical fiber between said optical transmitter and said optical receiver, said index-guiding optical fiber comprising a microstructured core having at least 50 percent of its cross-sectional area occupied by voids.

2. The optical communications link of claim 1, wherein said optical transmitter is adapted to transmit an optical signal modulated at 10 Gbps or greater, wherein said optical transmitter and said optical receiver are separated by a distance greater than or equal to 100 km, and wherein no optical amplifiers or regenerators are required between said optical transmitter and said optical receiver.

3. The optical communications link of claim 2, wherein said microstructured core has at least 90 percent of its cross-sectional area occupied by voids, and wherein said optical transmitter and said optical receiver are separated by a distance greater than or equal to 300 km, with no optical amplifiers or regenerators being required between said optical transmitter and said optical receiver.

4. The optical communications link of claim 3, wherein said optical signal has a center wavelength located within a transmission band of about 1350 nm–1600 nm.

5. The optical communications link of claim 4, said optical transmitter being further adapted to transmit a plurality of wavelength-division-multiplexed signals modulated at 10 Gbps or greater and spaced apart by at least 0.4 nm, whereby said optical communications link is capable of a data throughput of up to 6.25 Tbps.

6. The optical communications link of claim 4, said optical transmitter being further adapted to transmit a plurality of wavelength-division-multiplexed signals modulated at 10 Gbps or greater and spaced by at least 4.0 nm, whereby said optical communications link is capable of a data throughput up to 625 Gbps, and whereby lower precision, lower cost filtering equipment may be used in said optical transmitter and optical receiver due to corresponding channel separations of at least about 500 GHz.

7. The optical communications link of claim 3, wherein said optical signal has a center wavelength located within a transmission band of about 1500 nm–1600 nm.

8. The optical communications link of claim 7, said optical transmitter being further adapted to transmit a plurality of wavelength-division-multiplexed signals modulated at 10 Gbps or greater and spaced apart by at least 0.4 nm, whereby said optical communications link is capable of a data throughput of up to 2.50 Tbps.

9. The optical communications link of claim 3, wherein said optical signal has a center wavelength located within a transmission band of about 1200 nm–1300 nm.

10. The optical communications link of claim 3, wherein said optical signal has a center wavelength located within a transmission band of about 1530 nm–1570 nm.

11. The optical communications link of claim 3, wherein said optical signal has a center wavelength located within a transmission band of about 900 nm–1300 nm.

12. The optical communications link of claim 2, wherein said optical signal has a center wavelength located in a transmission band of about 1500 nm–1600 nm.

13. The optical communications link of claim 12, said optical transmitter being further adapted to transmit a plurality of wavelength-division-multiplexed signals modulated at 10 Gbps or greater and spaced by at least 4.0 nm, whereby said optical communications link is capable of a data throughput up to 250 Gbps, and whereby lower precision, lower cost filtering equipment may be used in said optical transmitter and optical receiver due to corresponding channel separations of at least about 500 GHz.

14. The optical communications link of claim 13, wherein said voids comprise a gas or vacuum.

15. The optical communications link of claim 13, wherein said voids comprise a liquid or solid having a lower index of refraction than that of silica glass.

16. The optical communications link of claim 12, said optical transmitter being further adapted to transmit a plurality of wavelength-division-multiplexed signals modulated at 10 Gbps or greater and spaced apart by at least 0.4 nm, whereby said optical communications link is capable of a data throughput up to 2.50 Tbps.

17. The optical communications link of claim 2, wherein said optical signal has a center wavelength located within a transmission band of about 1530 nm–1570 nm.

18. The optical communications link of claim 1, further comprising a dispersion-compensating fiber interposed between said optical transmitter and said optical receiver, wherein said microstructured core has at least 90 percent of its cross-sectional area occupied by voids, wherein said optical transmitter is adapted to transmit an optical signal modulated at 40 Gbps or greater, wherein said optical signal has a center wavelength located within a transmission band of about 1500 nm–1570 nm, wherein said optical transmitter and said optical receiver are separated by a distance greater than or equal to 300 km, and wherein no optical amplifiers or regenerators are required between said optical transmitter and said optical receiver.

19. The optical communications link of claim 18, said optical transmitter being further adapted to transmit a plurality of wavelength-division-multiplexed signals modulated at 40 Gbps or greater and spaced by at least 8.0 nm, whereby said optical communications link is capable of a data throughput up to 240 Gbps, and whereby lower precision, lower cost filtering equipment may be used in said optical transmitter and optical receiver due to corresponding channel separations of at least about 1 THz.

20. The optical communications link of claim 19, wherein said voids comprise a gas or vacuum.

21. The optical communications link of claim 19, wherein said voids comprise a liquid or solid having a lower index of refraction than that of silica glass.

22. The optical communications link of claim 18, said optical transmitter being further adapted to transmit a plurality of wavelength-division-multiplexed signals modulated at 40 Gbps or greater and spaced apart by at least 1.6 nm, whereby said optical communications link is capable of a data throughput up to 1.20 Tbps.

23. The optical communications link of claim 1, further comprising a dispersion-compensating fiber interposed between said optical transmitter and said optical receiver, wherein said optical transmitter is adapted to transmit an optical signal modulated at 40 Gbps or greater, wherein said optical signal has a center wavelength located within a transmission band of about 1500 nm–1550 nm, wherein said optical transmitter and said optical receiver are separated by a distance greater than or equal to 100 km, and wherein no optical amplifiers or regenerators are required between said optical transmitter and said optical receiver.

24. The optical communications link of claim 23, said optical transmitter being further adapted to transmit a plurality of wavelength-division-multiplexed signals modulated at 40 Gbps or greater and spaced apart by at least 1.6 nm, whereby said optical communications link is capable of a data throughput up to 1.20 Tbps.

25. The optical communications link of claim 23, said optical transmitter being further adapted to transmit a plurality of wavelength-division-multiplexed signals modulated at 40 Gbps or greater and spaced by at least 8.0 nm, whereby said optical communications link is capable of a data throughput up to 240 Gbps, and whereby lower precision, lower cost filtering equipment may be used in said optical transmitter and optical receiver due to corresponding channel separations of at least about 1 THz.

26. A communications system, comprising:
 a source transmitter for generating an optical signal at a source location;
 a destination receiver for receiving said optical signal at a destination location; and
 a plurality of regeneration spans sequentially coupled between said source transmitter and said destination receiver, each regeneration span comprising:
  a regenerator for receiving, regenerating, and retransmitting said optical signal at an intermediate location between said source transmitter and said destination transmitter; and
  a fiber optic span coupled between said regenerator and a regenerator associated with an adjacent regeneration span;
 wherein said fiber optic span comprises an optical fiber having a core region in which a majority of the cross-sectional area is occupied by voids.

27. The communications system of claim 26, wherein said optical fiber has a cladding region in which a majority of the cross-sectional area is occupied by voids.

28. The communications system of claim 27, wherein said optical fiber has a dispersion magnitude of less than 10 ps/(nm-km) between 1100 nm and 1600 nm.

29. The communications system of claim 28, wherein said optical fiber has an attenuation magnitude of less than 0.20 dB/km between 1450 nm and 1600 nm.

30. The communications system of claim 29, wherein said optical fiber has a core region in which at least 90% of the cross-sectional area is occupied by voids, wherein said optical signal is modulated at 40 Gbps or greater and is at a wavelength between 1450 nm and 1600 nm, wherein said regeneration spans do not include optical amplifiers, wherein said regeneration spans have a maximum regeneration span length corresponding to a maximum allowable distance between regenerators, and wherein said maximum regeneration span length is not less than 30 km.

31. The communications system of claim 30, wherein said regeneration spans include dispersion-compensating fibers, and wherein said maximum regeneration span length is not less than 300 km.

32. The communications system of claim 31, said dispersion-compensating fibers having a dispersion of approximately −200 ps/(nm-km) or greater, wherein less than 3 km of dispersion-compensating fiber is required for each 300 km regeneration span.

33. The communications system of claim 32, wherein said dispersion-compensating fibers are equally distributed among, and co-located with, said regenerators.

34. The communications system of claim 31, said optical signal further comprising a plurality of wavelength-division-multiplexed signals between 1450 nm and 1600 nm modulated at 40 Gbps or greater and spaced apart by at least 1.6 nm, whereby said communications system is capable of a data throughput of up to 3.72 Tbps.

35. The communications system of claim 31, said optical signal further comprising a plurality of wavelength-division-multiplexed signals between 1450 nm and 1600 nm modulated at 40 Gbps or greater and spaced by at least 8.0 nm, whereby said communications system is capable of a data throughput up to 720 Gbps, and whereby lower precision, lower cost filtering equipment may be used in said communications system due to corresponding channel separations of at least about 1 THz.

36. The communications system of claim 31, wherein said voids comprise a gas or vacuum.

37. The communications system of claim 31, wherein said voids comprise a liquid or solid having a lower index of refraction than that of silica glass.

38. The communications system of claim 29, wherein said optical signal is modulated at 10 Gbps or greater and is at a wavelength between 1450 nm and 1600 nm, wherein said regeneration spans have a maximum regeneration span length corresponding to a maximum allowable distance between regenerators, and wherein said maximum regeneration span length is not less than 100 km.

39. The communications system of claim 38, wherein said regeneration spans include dispersion-compensating fibers and at least one optical amplifier, wherein said regeneration spans have a maximum attenuation-limited amplifier spacing corresponding to a maximum distance between any two optical amplifiers or between an optical amplifier and a regenerator, wherein said maximum attenuation-limited amplifier spacing is not less than 100 km, and wherein said maximum regeneration span length is not less than 500 km.

40. The communications system of claim 39, wherein said optical fiber has a core region in which at least 90% of the cross-sectional area is occupied by voids, and wherein said maximum attenuation-limited amplifier spacing is not less than 250 km.

41. The communications system of claim 40, said optical signal further comprising a plurality of wavelength-division-multiplexed signals between 1450 nm and 1600 nm modulated at 10 Gbps or greater and spaced by at least 4.0 nm, whereby said communications system is capable of a data throughput up to 375 Gbps, and whereby lower precision, lower cost filtering equipment may be used in said communications system due to corresponding channel separations of at least about 500 GHz.

42. The communications system of claim 41, wherein said voids comprise a liquid or solid having a lower index of refraction than that of silica glass.

43. The communications system of claim 41, wherein said voids comprise a gas or vacuum.

44. The communications system of claim 40, said optical signal further comprising a plurality of wavelength-division-multiplexed signals between 1450 nm and 1600 nm modulated at 10 Gbps or greater and spaced apart by at least 0.4 nm, whereby said communications system is capable of a data throughput of up to 3.75 Tbps.

45. The communications system of claim 29, wherein said optical signal is modulated at 10 Gbps or greater and is at a wavelength between 1100 nm and 1300 nm, wherein said regeneration spans do not include dispersion-compensating fibers or optical amplifiers, wherein said regeneration spans have a maximum regeneration span length corresponding to a maximum allowable distance between regenerators, and wherein said maximum regeneration span length is not less than 100 km.

46. The communications system of claim 45, wherein said optical fiber has a core region in which at least 90% of the cross-sectional area is occupied by voids, and wherein said maximum regeneration span length is not less than 250 km.

47. The communications system of claim 46, said optical signal further comprising a plurality of wavelength-division-multiplexed signals between 1100 nm and 1300 nm modulated at 10 Gbps or greater and spaced by at least 4.0 nm, whereby said communications system is capable of a data throughput up to 500 Gbps, and whereby lower precision, lower cost filtering equipment may be used in said communications system due to corresponding channel separations of at least about 500 GHz.

48. The communications system of claim 47, wherein said voids comprise a gas or vacuum.

49. The communications system of claim 47, wherein said voids comprise a liquid or solid having a lower index of refraction than that of silica glass.

50. The communications system of claim 46, said optical signal further comprising a plurality of wavelength-division-multiplexed signals between 1100 nm and 1300 nm modulated at 10 Gbps or greater and spaced apart by at least 0.4 nm, whereby said communications system is capable of a data throughput of up to 5.00 Tbps.

51. An optical communications link, comprising:
   an optical transmitter for transmitting an optical signal having a center wavelength between about 1450 nm and 1600 nm, said optical signal being modulated at 10 Gbps or greater;
   an optical receiver for receiving said optical signal; and
   an optical fiber between said optical transmitter and said optical receiver, said optical fiber having an attenuation of less than 0.04 dB/km and a dispersion magnitude of less than 2 ps/(nm-km) between 1450 nm and 1600 nm;
   whereby said optical transmitter and said optical receiver may have a separation of up to 500 km without requiring optical amplifiers or dispersion-compensating fibers therebetween.

52. The communications link of claim 51, said optical transmitter being further adapted to transmit a plurality of wavelength-division-multiplexed signals between 1450 nm and 1600 nm modulated at 10 Gbps or greater and spaced by at least 4.0 nm, whereby said communications system is capable of a data throughput up to 375 Gbps, and whereby lower precision, lower cost filtering equipment may be used in said communications system due to corresponding channel separations of at least about 500 GHz.

53. The communications link of claim 52, wherein said optical fiber comprises a cladding region in which at least 90% of the cross-sectional area is occupied by voids.

54. The communications system of claim 53, wherein said voids comprise a gas or vacuum.

55. The communications system of claim 53, wherein said voids comprise a liquid or solid having a lower index of refraction than that of silica glass.

56. The communications link of claim 51, said optical transmitter being further adapted to transmit a plurality of wavelength-division-multiplexed signals between 1450 and 1600 nm modulated at 10 Gbps or greater and spaced apart by at least 0.4 nm, whereby said optical communications link is capable of a data throughput up to 3.75 Tbps.

57. The communications link of claim 56, wherein said optical fiber comprises a core region in which at least 90% of the cross-sectional area is occupied by voids.

58. An optical communications link, comprising:
   an optical transmitter for transmitting an optical signal having a center wavelength between about 1450 nm and 1600 nm, said optical signal being modulated at 40 Gbps or greater;
   an optical receiver for receiving said optical signal;
   an optical fiber between said optical transmitter and said optical receiver, said optical fiber having an attenuation of less than 0.04 dB/km and a dispersion magnitude of less than 2 ps/(nm-km) between 1450 nm and 1600 nm; and
   at least one dispersion-compensating fiber interposed between said optical transmitter and said optical receiver;
   whereby said optical transmitter and said optical receiver may have a separation of up to 300 km without requiring optical amplifiers therebetween.

59. The communications link of claim 58, said optical transmitter being further adapted to transmit a plurality of wavelength-division-multiplexed signals between 1450 and 1600 nm modulated at 40 Gbps or greater and spaced apart by at least 1.6 nm, whereby said optical communications link is capable of a data throughput up to 3.72 Tbps.

60. The communications link of claim 59, wherein said optical fiber comprises a core region in which at least 90% of the cross-sectional area is occupied by voids.

61. The communications link of claim 60, wherein said optical fiber comprises a cladding region in which at least 90% of the cross-sectional area is occupied by voids.

62. The communications system of claim 61, wherein said voids comprise a liquid or solid having a lower index of refraction than that of silica glass.

63. The communications system of claim 61, wherein said voids comprise a gas or vacuum.

64. The communications link of claim 59, said optical transmitter being further adapted to transmit a plurality of wavelength-division-multiplexed signals between 1450 nm and 1600 nm modulated at 40 Gbps or greater and spaced by at least 8.0 nm, whereby said communications system is capable of a data throughput up to 720 Gbps, and whereby lower precision, lower cost filtering equipment may be used in said communications system due to corresponding channel separations of at least about 500 GHz.

65. A method of transmitting information within a band of wavelengths over an optical communication link between two stations separated by at least 50 km, comprising:
   providing a continuous, index-guiding optical fiber between said stations, said fiber having at least half its core cross-sectional area occupied by subwavelength microstructures having at least one dimension smaller than the wavelengths in said band; and
   transmitting modulated optical signals related to said information through said continuous fiber.

66. A method as in claim 65 in which the transmitting step comprises transmitting wavelength-division-multiplexed optical signals.

67. A method as in claim 66 in which said providing comprises causing said continuous fiber to have an attenuation of less than about 0.2 db/km and a dispersion magnitude of less than about 10 ps/(nm-km) for optical signals having center wavelengths substantially throughout the range of about 1450 nm to about 1600 nm.

68. A method as in claim 66 in which said providing comprises causing said continuous fiber to have an attenuation of less than about 0.35 db/km and a dispersion magnitude of less than about 10 ps/(nm-km) for optical signals having center wavelengths substantially throughout the range of about 1100 nm to about 1300 nm.

* * * * *